(12) United States Patent
Yamashita et al.

(10) Patent No.: US 7,444,064 B2
(45) Date of Patent: Oct. 28, 2008

(54) BROADCAST RECEIVER, PROGRAM RECORDING METHOD AND PROGRAM PRODUCT

(75) Inventors: Tomochika Yamashita, Yokohama (JP); Atsuhiro Ono, Kitaura (JP); Satoshi Takahashi, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 675 days.

(21) Appl. No.: 10/996,053

(22) Filed: Nov. 24, 2004

(65) Prior Publication Data

US 2005/0123278 A1    Jun. 9, 2005

(30) Foreign Application Priority Data

Dec. 4, 2003    (JP)    ............... 2003-405584

(51) Int. Cl.
*H04N 5/91*    (2006.01)
(52) U.S. Cl. ............... 386/94; 360/60; 380/201; 710/200
(58) Field of Classification Search .......... 386/94; 360/60; 380/201; 710/200
See application file for complete search history.

(56) References Cited

U.S. PATENT DOCUMENTS

2002/0114462 A1    8/2002 Kudo et al.
2002/0126843 A1    9/2002 Murase et al.
2002/0141580 A1    10/2002 Okuyama
2003/0149886 A1    8/2003 Ito et al.
2004/0181688 A1*    9/2004 Wittkotter ............... 713/201

FOREIGN PATENT DOCUMENTS

JP    2002-245718 A    8/2002
JP    2002-300517 A    10/2002
JP    2003-228522    8/2003

* cited by examiner

*Primary Examiner*—Thai Tran
*Assistant Examiner*—Girumsew Wendmagegn
(74) *Attorney, Agent, or Firm*—McDermott Will & Emery LLP

(57) ABSTRACT

The broadcast receiver that incorporates an HDD as a recording medium and records programs on the recording medium, when recording a program on the recording medium, determines whether the program content is prohibited from being copied afterward. If it is determined that the program content is prohibited from being copied afterward, the receiver divides the program content into segments of data size falling, for example, within the range between 45 sec. and 60 sec., as time taken to play back the data at 1× speed, and stores the segments into a plurality of files, respectively. Even in case of accidental disconnection of the device power or network interface, it becomes possible to positively move content that was once recorded on a recording medium to another external device and recording medium under the conditions prescribed for copyright protection.

17 Claims, 6 Drawing Sheets

BROADCAST RECEIVER, PROGRAM RECORDING METHOD AND PROGRAM PRODUCT

RELATED APPLICATIONS

This application claims the benefit of Japanese Application No. 2003-405584 filed in Japan, on Dec. 4, 2003, the disclosure of which also is entirely incorporated herein by reference.

TECHNICAL FIELD

The present techniques relate to a device and method for manipulating audio/video (AV) content transmitted by broadcasting that covers both digital and analog broadcasting and, more particularly, to a broadcast receiver incorporating an information recording medium such as a hard disk drive (HDD) and capable of recording broadcast programs on the recording medium in a facilitated manner and a broadcast program recording method for use in such receiver.

BACKGROUND

Lately, broadcasting by way of broadcast satellites and communication satellites and, even in terrestrial broadcasting, so-called digital TV broadcasting are growing popular in addition to traditional analog TV broadcasting. At home, systems for receiving different types of broadcasting are coming into popular use. In these digital systems, a huge number of programs are broadcasted, because many more channels are available than are provided in the traditional analog broadcasting only. Meanwhile, to record and play back such a great number of broadcast programs, diverse types of AV devices such as digital video tape recorders (VTRs), disk recorders, etc. are being put on the market one after another.

By the way, because recording/playback devices, such as digital VTRs perform digital recording and playback of video and audio signals, these devices inherently keep the signal quality free from deterioration. However, this means that same quality copies of originals can easily be made, and a possibility of unauthorized copying of a copyright program is pointed out. To eliminate this problem, e.g., a Digital Transmission Contents Protection (DTCP) scheme has lately been adopted for 1394 buses as a technique for preventing unauthorized copies. In this DTCP scheme, copy control information describing conditions for copying is added to audio and video streams, and the following three categories are defined: "copy free" (no limitation on copying), "copy never" (copying is prohibited), and "copy one generation" (copiable but once only). In the meantime, the recording/playback devices, such as digital VTRs are allowed to receive and record streams of "copy free" or "copy one generation" solely among the above categories. If a device records a "copy one generation" stream, it must change the copy control information in the recorded signal stream to "no more copies" (uncopiable) so that the stream is prohibited from being recorded any more by another recording device.

Recently, a stream recording/playback device called an HDD recorder has been realized. This device incorporates a large-capacity information recording medium, such as a hard disk drive (HDD) and, therefore, receives a great number of channels and records video and audio stream data on the HDD. However, the capacity of the disk fixedly installed in the device is still capped, even for the HDD recorder. Thus, if free disk space becomes scarce, the user would have to transfer content that is video and audio stream data stored on the disk to an external device, such as a VTR and an optical disk drive and store the content on another storage medium such as a magnetic tape or an optical disk on which information can be recorded.

In view of this situation, the above DTCP scheme defines a so-called "MOVE" function that enables moving of content by copying "no more copies" content once recorded on a recording medium to another recording medium and then deleting the original content or making it unable to be played back. According to the move function, this function can be executed solely for one recording medium, e.g., the one that is included in a receiver or digitally connected to the receiver, and it is stated that reproducible content data streams longer than one minute (60 seconds) must not exist on both the move source and the move destination simultaneously. A technique for implementing the move function is already known, e.g., the technique described in published patent application document (US2002/0114462A1).

Because of the need to delete or disable source content, to limit overlap on the two devices to less than 60 seconds, content may be damaged or lost due to an interruption of the move process, e.g., due to loss of power. A technique using the move function that can cope with a situation where the power of the source or destination device is tuned off in the course of moving content is already known, e.g., in patent documents (US2002/0114462A1, US2002/0141580A1). In this technique, a file recorded on the source recording medium is segmented into smaller data of a predetermined size and the data is transferred to the receiving side device. Each time such data is output, the data is erased from the source recording medium. In case the sending side device or the receiving side device is powered off in the course of data output operation, an end flag is added to the data that is output to the receiving side device.

SUMMARY

However, the foregoing techniques of prior art do not completely conform to the specified rules for the move function. In these prior art techniques, particularly, according to the replay device and replay method described in the above published patent application (US2002/0141580A1), in the assumed situation when the device power is manually turned off or when the device detects a power-off request input via a network interface, the source device adds the end flag to the last of the stream of reproduction. Thus, this technique is not adaptable to unexpected occurrences, for instance, the device power is disconnected by accident or the network interface between the source and destination is disconnected in the course of moving the content. In that event, a problem may occur in the replay device according to the above prior art technique that the content on the move source is deleted, whereas the whole content is not moved completely to the move destination, or that an illegal state occurs where reproducible content data streams longer than one minute (60 seconds) exist on both the move source and the move destination simultaneously.

In consideration of the above problem, an objective is to provide a broadcast program recording method and a broadcast receiver that allow for positive moving of content that was once recorded on a recoding medium to another external device and recording medium under the above conditions defined for copyright protection, even if the move is unexpectedly interrupted, e.g. because the device power, network interface, and communication link is disconnected by accident or other reasons.

Most of broadcast receivers having the function of recording broadcast content streams on the information recording medium incorporated therein are provided with a so-called time shift function (button). This function records video and audio data broadcasted at a time and plays back the recording after the elapse of a predetermined time, thus enabling a time shifted display of a broadcast after receiving the broadcast. In the case where a file recorded on the recording medium is segmented into smaller data of given size so that power disruption in the middle of moving broadcast content can be coped with, as described in the above published patent application (US2002/0141580A1), writing content data being broadcasted and reading content data to be displayed must be performed simultaneously between a plurality of files. Another objective is to provide a broadcast program recording method and a broadcast receiver that can implement the time shift function more reliably and simply even in the above case.

In order to achieve one or more of these and other objectives, there is provided a broadcast program recording method for recording a broadcast program on a recording medium. When recording the broadcast program on the recording medium, the broadcast program recording method determines whether the program content is prohibited from being copied afterward. Upon determining that the program content is prohibited from being copied afterward, the method records the program, while segmenting the program content into a plurality of units having a predetermined size. The segments of program content of the predetermined size are stored as a plurality of files on the recording media.

Preferably, in the broadcast program recording method described above, when recording on the recording medium, the method stores the program content as digital picture data into the recording medium, and the size of files as the units of recording the program content is set to 60 seconds or shorter on the assumption that the digital picture data is played back at 1× speed. It is also preferable to set the size of the files to fall within a range between 45 seconds and 60 seconds on the assumption that the digital picture data is played back at 1× speed. It is also preferable to set the size of the files to fall within a range between 72 Mb and 1440 Mb. In the present method, when recording on the recording medium, it is preferable to record digital picture data, taking its recording mode and data amount into consideration.

There is also provided a broadcast program recorder which receives data representing a program with information indicative of copy limitation and records the received data on a recoding media. If the processor of the recorder detects the information indicating to limit another copy, the processor controls the recorder to record the data representing the program as a plurality of divided files. If the processor does not detect the information indicating to limit a copy, the processor controls the recorder to record all of the data representing the program as a program file.

There is also provided a program product to perform a sequence of steps. The steps include receiving data representing a program with information indicative of copy limitation, detecting the information indicating to limit another copy, recording the data representing the program as a plurality of divided files if the information prohibits another copy, recording all of the data representing the program as a file if the detected information does not prohibit another copy.

Additional objects, advantages and novel features will be set forth in part in the description which follows, and in part will become apparent to those skilled in the art upon examination of the following and the accompanying drawings or may be learned by production or operation of the examples.

The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 2:
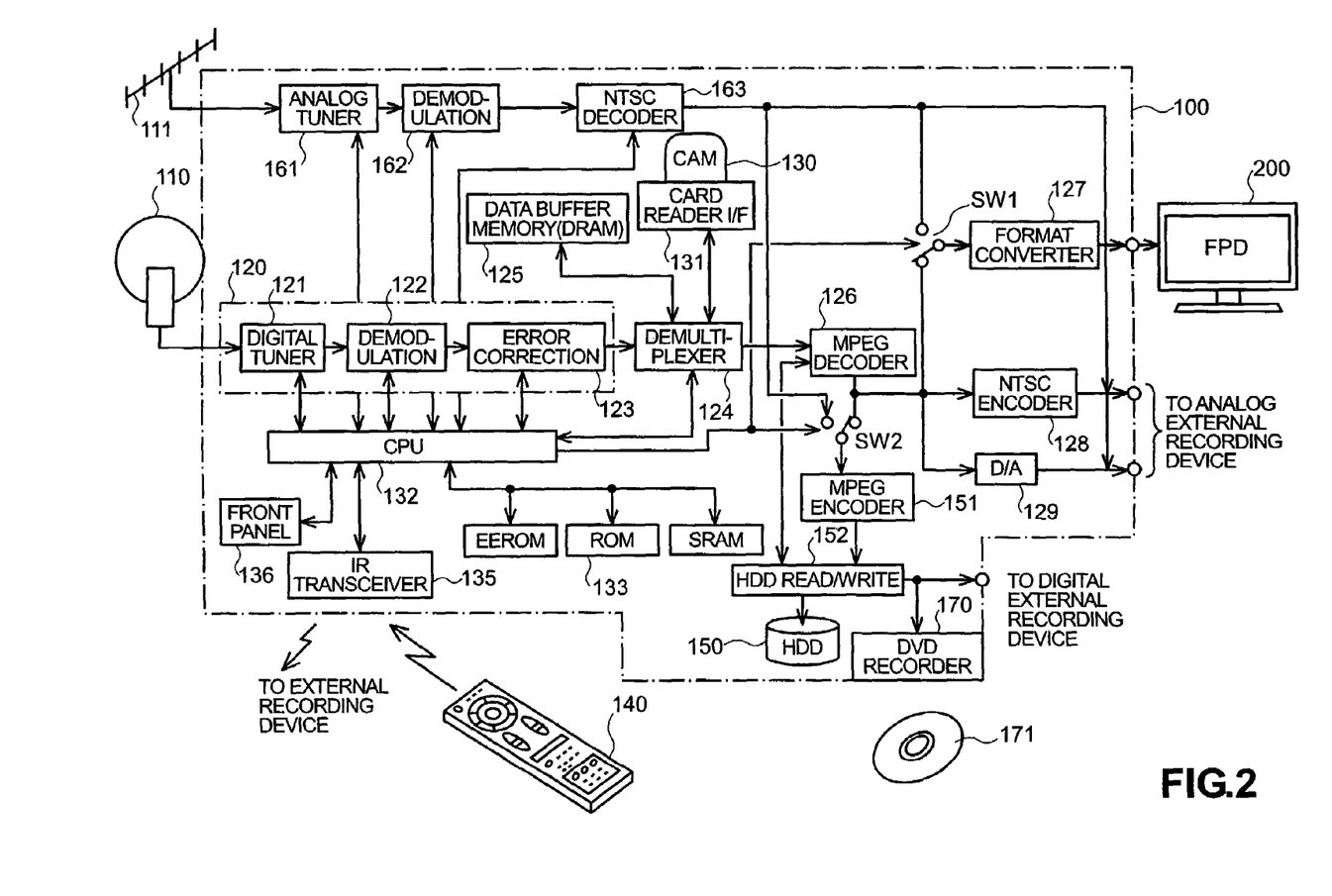
FIG. 2 is a block diagram showing the detailed internal configuration of an example of the broadcast receiver.

FIG. 2 attached is a block diagram showing an example of a broadcast receiver configuration with recording and reproducing capabilities. In this figure, reference numeral 100 denotes an AV device (broadcast receiver) that receives digital and analog broadcasts and displays the broadcast content (including video/audio programs, programs provided by data broadcasting, and data provided by data broadcasting) on what is called a flat panel display (FPD) 200, such as a plasma display panel and a liquid crystal display panel.

In FIG. 2, reference numeral 110 denotes a parabola antenna for receiving digital broadcasts. From this antenna 110, an RF signal is supplied to a digital tuner 121 which is a constituent of a digital tuner module (or front end) 120 in the digital broadcast receiver 100 and demodulated. The output of the digital tuner 121 is supplied to, e.g., a QPSK demodulation circuit 122 which is also a constituent of the tuner module 120 and QPSK demodulated by this demodulator. Then, the output of the QPSK demodulation circuit 122 is supplied to an error correction circuit 123 which is also a constituent of the tuner module 120 and, in this circuit, any error that occurred during transmission is detected and corrected. Consequently, this tuner module 120 picks out channel signals with a specified frequency and extracts the transport stream (TS).

A demultiplexer 124 receives the signal stream output from the error correction circuit 123 of the digital tuner module 120 and temporarily stores the signal stream into a data buffer memory (Dynamic Random Access Memory (DRAM) or Static Random Access Memory (SRAM)) 125. Then, the demultiplexer 124 reads the signal stream in order and breaks it into video and audio streams which are in turn supplied to an MPEG decoder 126. In other words, demultiplexing by the demultiplexer 124 is to extract necessary streams from the transport stream (TS) that consists of a plurality of video and audio streams multiplexed by a multiplexer (MUX) of the transmitter. The demultiplexer 124 performs so-called filtering to extract necessary streams from the packets of different streams. In a table named program map table (PMT) for a channel tuned in, the packet IDs (PIDs) of audio and video streams constituting a broadcast on the channel are specified. On the receiver, the demultiplexer filters the packets by the PIDs and extracts the video and audio streams from which a desired program can be presented or recorded.

A card reader interface (I/F) 131 is also connected to the demultiplexer 124 to read key data from a Conditional Access Module (CAM) 130 that was inserted into it. The CAM 130 consists of an IC card having CPU, ROM, RAM, and other elements arranged therein. Key data required for decryption as well as a decryption program are stored in the IC card 130. The decryption is to perform what is called descrambling for scrambled and transmitted signal streams for, e.g., charged broadcasts in order to present a program from these signal streams. Here, the key data is read from the CAM 130 via the card reader I/F 131 and supplied to the demultiplexer 124, and the demultiplexer 124 decrypts the encrypted signal streams with this key.

Then, the video and audio streams extracted by the demultiplexer 124 are supplied to the MPEG decoder 126. The MPEG decoder 126 stores the input digital signal streams in sequence into its internal DRAM or the like and decodes the video and audio signals compressed by MPEG (especially MPEG2).

The broadcast receiver 100 is also equipped with an analog antenna 111 for receiving analog broadcasts and an analog tuner 161, analog demodulation circuit 162, and NTSC decoder 163 which constitute an analog tuner module. From the analog tuner module, video and audio signal streams of analog broadcast programs are output.

In the broadcast receiver 100, either the video and audio signal streams received and processed through the digital tuner module 120 or the video and audio signal streams converted into a predetermined format through the analog tuner module are selected by a switch SW1. Then, the selected streams are converted into a predetermined format by a format converter 127 and output to the flat panel display (FPD) 200, such as a plasma display panel and a liquid crystal display panel, and then displayed. Alternatively, these video and audio signal streams are also output to an analog external device, such as CRT or VCR, as the figure shows, so that they can be displayed or recorded on the external device. Here, the video and audio signal streams, after conversion into a predetermined format by the MPEG decoder 126, are further converted into a so-called NTSC format by an NTSC converter 128 or converted by a D/A converter 129, and then output.

In the above FIG. 2, a Central Processor Unit (CPU) 132 is placed in the digital broadcast receiver 100, and the CPU performs various kinds of processing, according to programs stored in a ROM 133. The CPU controls, e.g., the digital tuner 121, QPSK modulation circuit 122, and the error correction circuit 123 which constitute the digital tuner module 120, the analog tuner module, and other components. The receiver is also equipped with an IR transceiver 135 which emits or receives infrared control signals, and the CPU 132 outputs or receives predetermined control signals to/from an external AV device through the IR transceiver.

Various commands can be input directly to the CPU 132 by operating manual operation buttons and switches on the front panel 136 located on the front surface of the receiver. Besides, a so-called remote controller 140 is available. The commands can also be input by operating the buttons and keys on the remote controller. An input infrared signal from the remote controller is emitted from the IR transmitter provided on the top end of the remote controller toward the IR transceiver 135. This input signal is input to the CPU 132, and thus a predetermined command can be input to the CPU by operating the remote controller as well.

In the above FIG. 2, the broadcast receiver 100 further includes a hard disk drive (HDD) 150 for recording the contents (video and audio information) of programs. Data is recorded on the HDD 150 as follows. Video and audio signal streams decoded by the MPEG decoder 126 are compressed into digital signal streams again by an MPEG encoder 151. The digital signal streams are recorded on the HDD 150 by a HDD read/write circuit 152, which performs data recording by executing a predetermined recording process. As is indicated by a bidirectional arrow shown, the video and audio signal streams decoded by the MPEG decoder 126 are directly input to the HDD read/write circuit 152. Not shown in the figure, it is also possible to be directly input to the HDD read/write circuit 152 from the Demultiplexer 124. When information once recorded on the HDD is played back, compressed signal streams are read from the HDD 150 by the HDD read/write circuit 152 from which the signal streams are input to the MPEG decoder 126 again. Then, the video and audio signal streams are decoded and the decoded signal streams are, after converted into a predetermined format by the format converter 127, output to the flat panel display 200 and played back or output to the external device such as VCR or DVD recorder. SW2 in this figure is a switch to select either the video and audio signal streams output from the analog tuner module or the video and audio signal streams decoded by the MPEG decoder 126, after received and processed through the digital tuner module 120.

As is apparent from the figure, the broadcast receiver 100 further includes a digital information recording device such as a DVD recorder 170, so that compressed signal streams, after read from the HDD 150 by the HDD read/write circuit 152, can be recorded on a DVD disk 171 inserted into the DVD recorder 170. A path from the HDD read/write circuit 152 goes to a terminal through which signal streams read from the HDD 15 are output to an external digital recording device.

Figure 1:
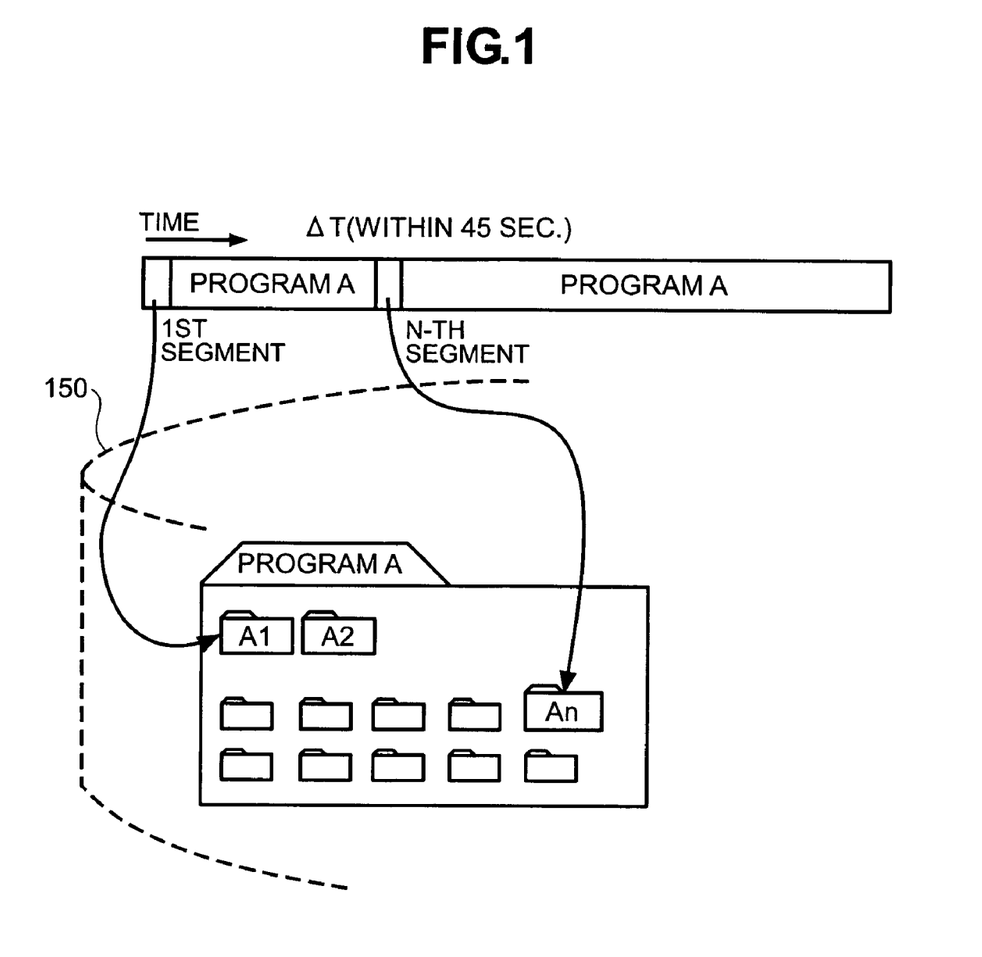
FIG. 1 is a diagram to explain segmental recording which is included in the broadcast signal recording method that is performed in the broadcast.

Next, operation of the broadcast receiver 100 in which the techniques is embodied, the configuration of which has been explained above in detail, particularly, the operation of recording received broadcast signal streams will be discussed in detail hereinafter with reference to FIG. 1 attached. The following description explains the operation in which the video and audio signal streams output from the analog tuner module or the video and audio signal streams decoded by the MPEG decoder 126, after received and processed through the digital tuner module 120, are compressed by the MPEG encoder 151 and recorded on the HDD 150 by the HDD read/write circuit 152.

Figure 4:
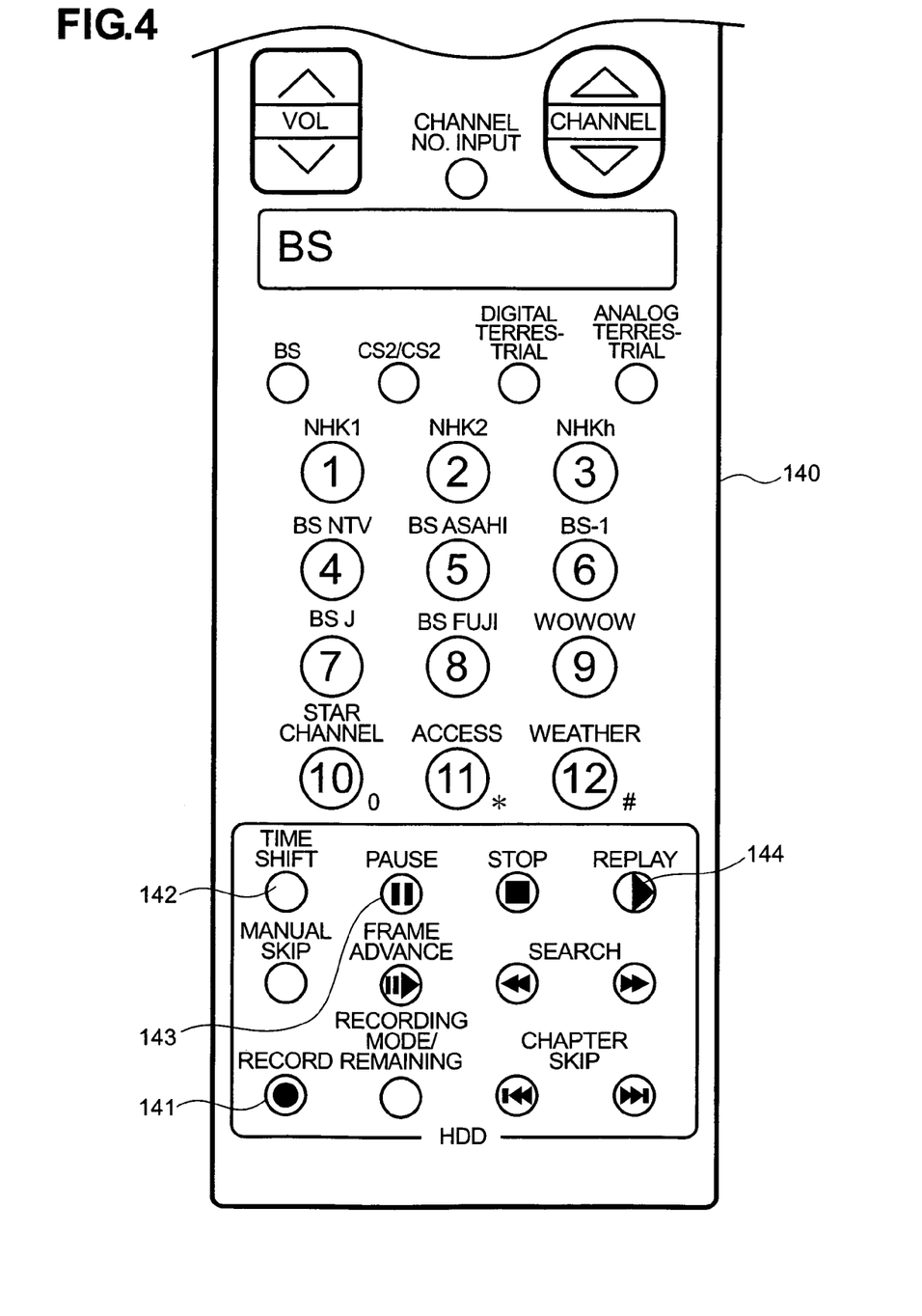
FIG. 4 is a front view of a remote controller that is used for recording operation with the above broadcast receiver to show its illustrative key/button arrangement.

The broadcast program recording operation is performed when a "RECORD" button 141 on a remote controller 140, e.g., shown in FIG. 4 attached, is pressed, when the time to start recording, booked in advanced, has come, or when a so-called time shift recording (function) is performed. The time shift recording allows the user to temporally record a program being broadcasted while the viewer has to walk away or do something else during reception of the broadcast program and play back the recording of the program after going back so as not to miss a beautiful scene on the air. To execute the time shift recording (function), a user press as a "TIME SHIFT" 142 button on the remote controller 140. Afterward, when the user goes back and is going to continue watching, by pressing a "PAUSE" button 143 or "REPLAY" button 144, the playback starts.

Figure 3:
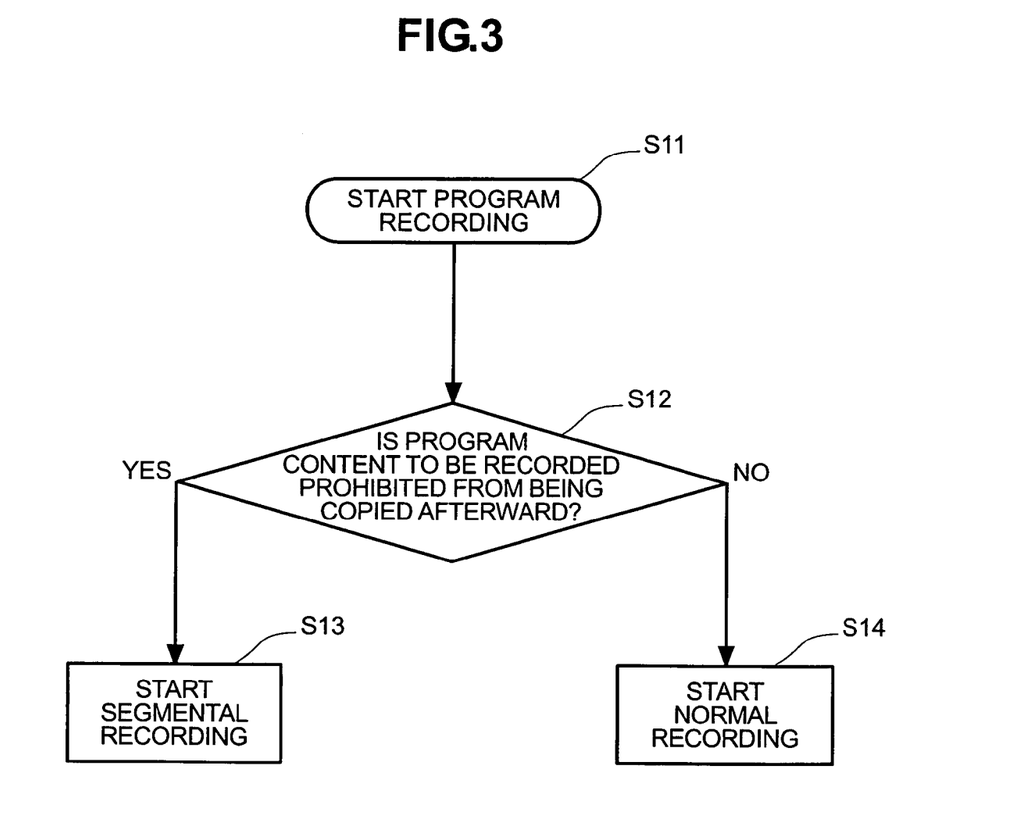
FIG. 3 is a flowchart to explain the broadcast signal recording method.

Next, details of the broadcast program recording operation will be explained below with reference to a flowchart shown in FIG. 3 attached. First, as described above, when the "RECORD" button 141 is pressed, when the time to start booked recording has come, or the "TIME SHIFT" button 142 is pressed, the receiver starts recording a program (step S11). Next, it is determined whether the received program content to be recorded is prohibited from being copied afterward (step S12). For instance, this is true for content of "copy one generation" (copiable but once only) in the DTCP scheme as discussed above. In that case, the copy control information in the recorded signal stream must be changed to "no more copies" (uncopiable), thereby prohibiting the content from being copied any more by another recording device.

Then, as the result of the decision in the step S12, if it is determined that the program content is prohibited from being copied afterward ("Yes"), the receiver starts segmental recording which will be described below in detail (step S13). Otherwise, if it is determined that the program content is not prohibited from being copied afterward ("No"), the receiver starts normal recording operation (step S14).

Next, the segmental recording that is performed by the broadcast receiver of the present invention will be explained with reference to FIG. 1 attached. For information provided by this figure, to explain its concept, the upper part shows video and audio signal data streams for the contents of broadcast programs that are to be recorded, and files on the HDD 150 into which the data is recorded are shown in the lower part of the figure.

As is apparent from the figure, when the segmental recording operation begins, e.g. when "program A" to be recorded, the content data of program A is segmented into a plurality of files (A1 to An) in a folder, e.g., a folder for "program A." Each segment comprises data within a predetermined information amount. The size of each of the plurality of files is set so that time (ΔT) taken for playing back the data recorded in each file at 1× speed falls within one minute (60 seconds or less). In the present embodiment, to ensure that the data amount recorded in each file falls within 60 seconds, specifically, the file size is set so that the time ΔT falls within 45 seconds, taking a variation margin in the mount of actually recorded data into consideration. Accordingly, as the figure shows, when recording the bit stream of a program that is prohibited from being copied afterward, the stream is segmented into the plurality of files A1 to An having the given size and the segments are recorded in the HDD 150.

Now, data amount to be recorded in each file whose size is set so that the time (ΔT) taken for playing back the segment data recorded at 1× speed falls in the range between one minute (60 seconds) and 45 seconds is discussed more specifically. Practically, according to the recording mode that is set for recording as well as the time (ΔT) setting, the data amount that can be recorded in each file varies. For available recording modes, commonly, XP, SP, LP, and EP are defined for analog broadcast recording and TS (SD: standard) and TS (HD: high density) modes besides the foregoing are defined for digital broadcasts. Relationships between these recording modes and the data amount that can be recorded in each file for each mode are shown in Table 1 below.

TABLE 1

| Recording Mode | Bit Rate (Mbps) | Data Amount (45 sec) (Mb) | Data Amount (60 sec) (Mb) |
| --- | --- | --- | --- |
| XP | 10.8 | 486 | 648 |
| SP | 5.4 | 243 | 324 |
| LP | 2.7 | 121.5 | 162 |
| EP | 1.6 | 72 | 96 |
| TS (SD) | 12 | 540 | 720 |
| TS (HD) | 24 | 1080 | 1440 |

As is seen from Table 1, given that video and audio data is recorded so that the time (ΔT) for playing back the segment data falls within 45 seconds, the data amount per file should be managed between 72 Mb at minimum and 1080 Mb at maximum: in particular, the data amount depends on the recording mode. Likewise, given that video and audio data is recorded so that the time (ΔT) for playing back the segment data falls within one minute (60 seconds), the data amount per file should be managed between 96 Mb at minimum and 1440 Mb at maximum. In short, it is seen that the data amount to be recorded in each file should be managed in the range between 72 Mb and 1440 Mb.

Next, so-called move recording will be discussed, using FIGS. 5A and 5B attached. Video and audio data segments in a plurality of units (files) in the HDD 150, recorded by the segmental recording operation described above in detail, thereafter, are recorded on the DVD disk 171 by the DVD recorder 170 or output via the output terminal to another external recording device and recorded.

Figure 5A:
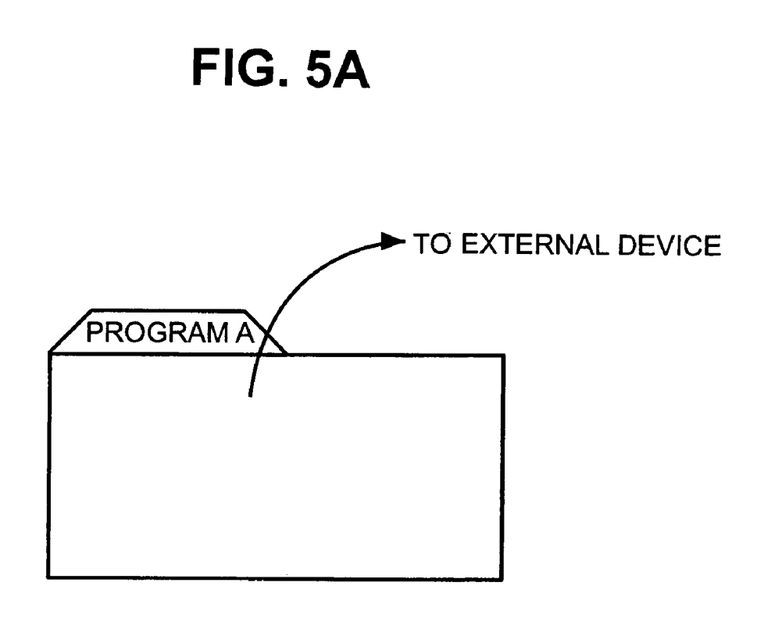
FIGS. 5A and 5B are diagrams to explain move operation in the above broadcast receiver.
Figure 5B:
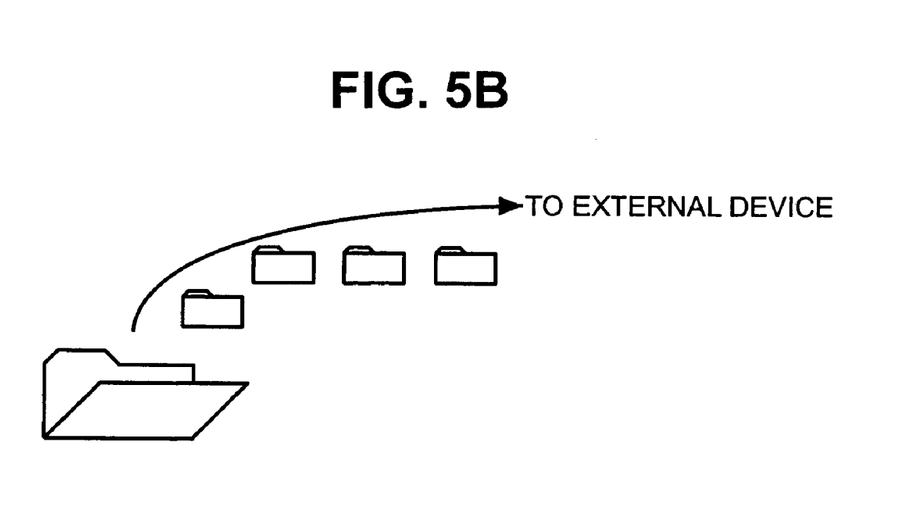

Specifically, as shown in FIG. 5A, when the recorded program A is moved to the DVD disk 171 or the external recording device, it is evident that the whole file "program A" alone should be moved, because the plurality of files (A1 to An) are stored in the "program A" file. As a result, as shown in FIG. 5B, with the move of the "program A" file, the plurality of files (A1 to An) stored therein are moved in sequence to the move destination (DVD disk or external recording device). By this move operation, in coincidence with recording of each file on the move destination disk or device, the corresponding file in the move source is deleted, as noted above.

As described above, moving the "program A" file is, in fact, sequentially moving each of the plurality of files (A1 to An) stored therein. Accordingly, even if such a situation occurs that the device power is disconnected by accident or the network interface is disconnected in the course of moving the content, in other words, video and analog data of a program, the moving performance is affected to a small extent that one file is lost in the worst case, that is, a content segment for, at the longest, one minute (60 to 45 seconds) is lost. Even if, in the middle of moving one file of content, a situation that the file data exists on both the move source and the move destination occurs, the above moving method eliminates the possibility to cause an illegal state where reproducible content data streams longer than one minute (60 seconds) exist on both the move source and the move destination simultaneously. That is, according to the segmental recording method in which the present invention is embodied, it becomes possible to move content that was once recorded on a recording medium to another external device and recording medium, while positively observing the conditions for moving prescribed for copyright protection.

Next, operation in which the above time shift recording (function) is performed, using the recorded video and audio data segments managed in the plurality of files of a predetermined unit size as described above, will be explained below, using FIGS. 6A and 6B attached.

Figure 6A:
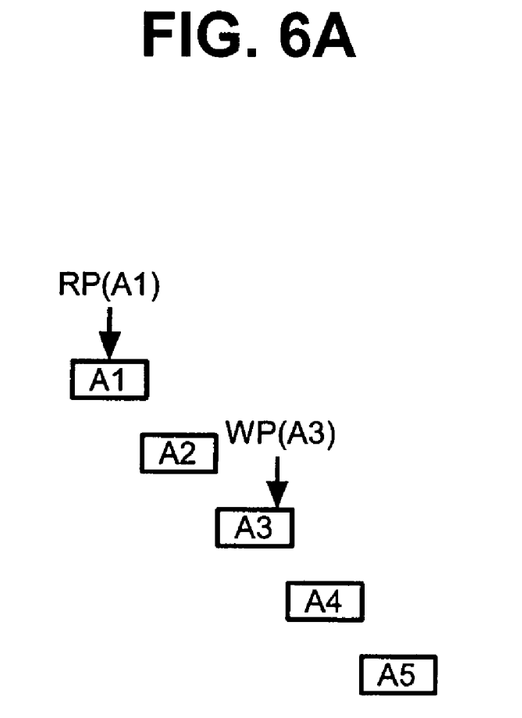
FIGS. 6A and 6B are diagrams to explain operation for implementing the time shift function in the above broadcast receiver.

As shown in FIG. 6A, in the HDD 150 which is the medium of recording the broadcast programs, a write pointer (WP) for recording a broadcast program and a read pointer (RP) for reading a recorded broadcast program do not access the same file at the same time if the length of a time shift (time difference between data write and read) is not shorter than a certain time duration, e.g., one minute. In the example of this figure, the WP is writing to a file A3, whereas the RP is reading from a different file A1 in which data was previously recorded. Therefore, the time shift recording (function) can be performed without a problem.

However, if the time shift is within one minute (or 45 seconds), at times the write pointer (WP) for writing data and the read pointer (RP) for reading data will access data in the same file. In that event, the management of relative positions of the WP and RP is required and, consequently, the control becomes complex and difficult. That is, in such event, there is a need for using different control modes for when the write pointer (WP) and the read pointer (RP) point at different files and for when these pointers point at a same file. In that event, it is difficult to perform the control, while switching between the modes continuously.

Figure 6B:
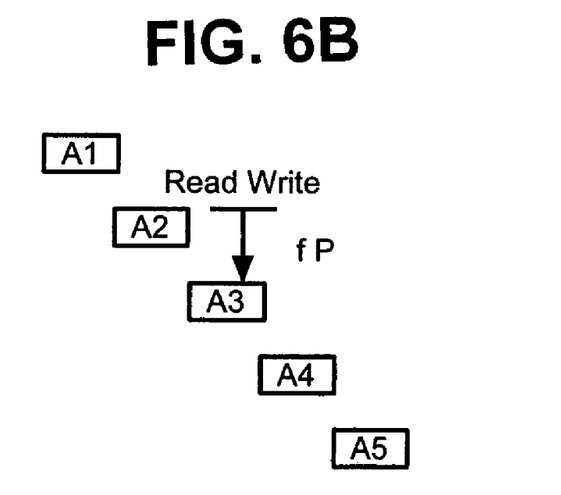

Thus, in the techniques, these pointer functions are performed by one file pointer fP and continuous control can be performed without regard to the access state; whether different files are accessed or a same file is accessed. More specifically, these functions are integrated into one file pointer fP; that is, as the file pointer fP moves across a same file, decision of whether read access or write access depends on its position. Using this file pointer fP is advantageous particularly for when the time shift is within one minute (or 45 seconds) or when both the write pointer (WP) and the read pointer (RP) have to function in one file.

When the read pointer (RP) comes to the file in which the write pointer (WP) exists, the file pointer (fP) appears as shown in FIG. 6B. The data for time shifting is read at a time and stored in a buffer memory (not shown in figures), and the user can watch the program smoothly reproduced from the buffer memory. Next the file pointer moves to the location in which data should be written. The data from the tuner module is stored in buffer memory first, then written to the HDD at a time. This read and write process is repeated when the file pointer (fP) appears. That is why reading and writing are performed by only one pointer (fP).

In this manner in which, as the pointer fP moves across a same file, reading or writing is determined, depending on its position, when the time shift recording (function) is performed, particularly even when the length of a time shift is within one minute (or 45 seconds), which requires both reading and writing across a same file, the time shift recording (function) can be implemented simply without the need of the management of relative positions of two points as mentioned above.

Operations described above may be carried out by execution of software, firmware, or microcode operating on a processor based digital receiver/recorder or on a computer of any type. Additionally, code for implementing such operations may be in the form of computer instruction in any form (e.g. source code, object code, interpreted code, etc. stored in or carried by any computer or machine readable medium.

Program aspects of the technology may be thought of a "products," typically in the form of executable code and/or associated data that is carried on or embodied in a type of machine readable medium. The executable code and/or associated data controls the operation of the broadcast receiver, computer or other programmable device for implementing the move processing. Media include any or all of the memory of the broadcast receiver or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from another computer (not shown) into the broadcast receiver or recorder or into another element, such as a web server used for software distribution or distribution of broadcast related information. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Terms regarding computer or machine "readable medium" (or media) as used herein therefore relate to any physical medium or transmission medium that participates in providing instructions or code or data to a processor for execution or processing. Such a medium may take many forms, including but not limited to, non-volatile media and volatile media as well as carrier wave and physical transmission media.

As described above, according to the broadcast program recording method and the broadcast receiver in which the techniques are embodied, even in case of accidental disconnection of the device power or network interface, it becomes possible to positively move content that was once recorded on a recording medium to another external device and recording medium under the conditions prescribed for copyright protection. Moreover, it becomes possible to implement time shift recording.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A recording apparatus comprising:
   an input terminal which receives data representing a program with information indicative of copy limitation;
   a recorder which records the received data on a recoding media; and
   a processor which detects the information indicative of copy limitation from the data, and controls the recorder;
   wherein if the processor detects the information which prohibits another copy, the processor controls the recorder to record the data representing the program as a plurality of divided files, and if the processor does not detect the information which prohibits another copy, the processor controls the recorder to record all of the data representing the program as a program file.

2. A recording apparatus according to claim 1, wherein each divided file includes an amount of the data corresponding to video data in the range of 45 to 60 seconds.

3. A recording apparatus according to claim 1, wherein each divided file includes data whose data quantity is in the range of 72 Mbytes to 1440 Mbytes.

4. A recording apparatus according to claim 1, wherein the plurality of divided files are arranged in a file which is generated by every program.

5. A recording apparatus according to claim 1, further comprising:
   an output terminal which outputs the recorded divided files to second recording media;
   wherein when each divided file is recorded in the second media, the divided file recorded in the recorder is deleted.

6. A recording apparatus according to claim 1, wherein the information indicating to limit another copy is indicated as 'copy one generation'.

7. A recording apparatus according to claim 1, wherein when the recorder records and reads the data to/from a file at the same time, the recorder uses the same pointer for reading and recording data to/from the media.

8. A recording apparatus according to claim 5, wherein if the output of the files is interrupted while outputting a divided file, the processor keeps files which have not been output yet in the recording media.

9. A recording method comprising:
   receiving data representing a program with information indicative of copy limitation;
   detecting the information indicative of copy limitation; and
   recording the data representing the program as a plurality of divided files if the information prohibits another copy and recording all of the data representing the program as a file if the information does not prohibit another copy.

10. A recording method according to claim 9, wherein each divided file includes an amount of the data corresponding to video data in the range of 45 to 60 seconds.

11. A recording method according to claim 9, wherein each divided file includes data whose data quantity is in the range of 72 Mbytes to 1440 Mbytes.

12. A recording method according to claim 9, further comprising:
   outputting each recorded file; and
   deleting each file which has been output.

13. A recording method according to claim 9, wherein the information indicative of copy limitation is indicated as 'copy one generation'.

14. A recording method according to claim 12 further comprising,
   keeping files which have not been output yet without deleting, if the output of the files is interrupted.

15. A recording and reproducing method:
   recording data representing the program as a plurality of divided files by using a recording pointer which specifies the location in the file; and
   reproducing the recorded data from the files by using a reading pointer which specifies the location in the file;
   wherein when data which is being recorded and data which is being reproduced are in the same file, the recording pointer and the reading pointer are combined as one pointer.

16. A recording and reproducing method according to claim 15, wherein the one pointer is moving through the file and selected as a write pointer or a read pointer depending on the location in the file.

17. A recording method according to claim 15, wherein each divided file includes the data corresponding to video data in the range of 45 to 60 seconds.

* * * * *